(12) United States Patent
Krolczyk et al.

(10) Patent No.: US 11,580,155 B2
(45) Date of Patent: Feb. 14, 2023

(54) DISPLAY DEVICE FOR DISPLAYING RELATED DIGITAL IMAGES

(75) Inventors: Marc Krolczyk, Spencerport, NY (US); Marc Nicolas Gudell, Penfield, NY (US); Frank Marino, Rochester, NY (US)

(73) Assignee: KODAK ALARIS INC., Rochester, NY (US)

( * ) Notice: Subject to any disclaimer, the term of this patent is extended or adjusted under 35 U.S.C. 154(b) by 228 days.

(21) Appl. No.: 13/072,811

(22) Filed: Mar. 28, 2011

(65) Prior Publication Data

US 2012/0249575 A1 Oct. 4, 2012

(51) Int. Cl.
*G06F 16/58* (2019.01)
*G06F 16/438* (2019.01)
*G06F 3/147* (2006.01)

(52) U.S. Cl.
CPC .......... *G06F 16/4393* (2019.01); *G06F 16/58* (2019.01); *G06F 3/147* (2013.01); *G09G 2340/14* (2013.01); *G09G 2380/16* (2013.01)

(58) Field of Classification Search
CPC .......... G06F 17/30056; G06F 16/4393; G06F 3/147; G06F 16/58; G06G 2340/14; G06G 2380/16
USPC ........................................................ 715/203
See application file for complete search history.

(56) References Cited

U.S. PATENT DOCUMENTS

| | | | |
|---|---|---|---|
| 4,754,271 A | 6/1988 | Edwards | |
| 5,898,430 A * | 4/1999 | Matsuzawa et al. | 715/204 |
| 6,408,301 B1 * | 6/2002 | Patton et al. | 707/741 |
| 6,606,411 B1 * | 8/2003 | Loui et al. | 382/224 |
| 6,763,182 B1 * | 7/2004 | Endo et al. | 386/224 |
| 6,928,612 B1 * | 8/2005 | Venable | 715/203 |
| 7,155,679 B2 | 12/2006 | Bandaru et al. | |
| 7,739,597 B2 * | 6/2010 | Wong | G06F 16/40 715/717 |

(Continued)

FOREIGN PATENT DOCUMENTS

| JP | 2007036737 A * | 2/2007 |
|---|---|---|
| WO | 2009/156785 | 12/2009 |

OTHER PUBLICATIONS

Johnson, Steve. "Microsoft Office PowerPoint 2007 On Demand" p. 310-311. Oct. 2006, Que Publishing.*

*Primary Examiner* — Kavita Stanley
*Assistant Examiner* — Tyler Schallhorn
(74) *Attorney, Agent, or Firm* — Hogan Lovells US LLP

(57) ABSTRACT

A digital image display device for displaying a sequence of digital media assets, the digital media assets including both individual digital still images and groups of related digital still images, comprising a display screen; a processor; and a processor-accessible program memory. The processor-accessible program memory stores executable instructions for causing the processor to execute the steps of: designating a sequence of digital media assets; and sequentially displaying each digital media asset in the sequence of digital media assets on the display screen, wherein if a displayed digital media asset is an individual digital still image it is displayed for a specified display time duration, and if a displayed digital media asset is a group of related digital still images the display time duration is subdivided and each of the digital still images in the group of related digital still images is displayed for a corresponding display time duration fraction.

17 Claims, 10 Drawing Sheets

(56) References Cited

U.S. PATENT DOCUMENTS

| | | | |
|---|---|---|---|
| 7,787,026 B1 | 8/2010 | Flory et al. | |
| 7,792,708 B2* | 9/2010 | Alva | G06Q 30/0601 705/26.1 |
| 7,796,779 B1* | 9/2010 | Strong | G06T 11/60 382/293 |
| 7,920,760 B2* | 4/2011 | Yoda | G06F 16/583 358/1.15 |
| 8,352,471 B2* | 1/2013 | Oami | H04N 5/2624 707/737 |
| 8,626,322 B2* | 1/2014 | Weber | G10L 25/48 381/100 |
| 8,656,312 B2* | 2/2014 | Kagaya | G06F 16/44 715/713 |
| 8,910,083 B2* | 12/2014 | Doucet | G06F 3/04845 715/838 |
| 9,110,927 B2* | 8/2015 | McAfee | G06F 16/51 |
| 2003/0090498 A1* | 5/2003 | Schick | H04N 1/00461 345/661 |
| 2004/0012810 A1* | 1/2004 | Haas et al. | 358/1.15 |
| 2004/0114904 A1* | 6/2004 | Sun et al. | 386/46 |
| 2004/0168118 A1* | 8/2004 | Wong | G06F 16/40 715/255 |
| 2004/0218894 A1* | 11/2004 | Harville et al. | 386/46 |
| 2005/0160112 A1* | 7/2005 | Makela et al. | 707/103 R |
| 2005/0275805 A1* | 12/2005 | Lin | G03B 31/06 352/12 |
| 2006/0265643 A1* | 11/2006 | Saft | G06F 16/957 715/209 |
| 2007/0030363 A1* | 2/2007 | Cheatle et al. | 348/239 |
| 2007/0236729 A1* | 10/2007 | Yoda | G06F 16/58 707/E17.02 |
| 2008/0016185 A1* | 1/2008 | Herberger et al. | 709/219 |
| 2008/0034284 A1* | 2/2008 | Skicewicz | G06F 17/30265 715/246 |
| 2008/0062282 A1 | 3/2008 | Shiimori | |
| 2008/0195962 A1* | 8/2008 | Lin | G06F 16/40 715/771 |
| 2008/0282156 A1* | 11/2008 | Skicewicz | G06F 17/30056 715/273 |
| 2009/0006968 A1* | 1/2009 | Trask | G06F 16/4393 715/730 |
| 2009/0044128 A1* | 2/2009 | Baumgarten | G06F 16/9577 715/738 |
| 2009/0070710 A1* | 3/2009 | Kagaya | G06F 16/44 715/810 |
| 2009/0167736 A1* | 7/2009 | Seydoux | G06F 3/14 345/207 |
| 2009/0207279 A1 | 8/2009 | Ochi et al. | |
| 2009/0256780 A1* | 10/2009 | Small | H04N 1/00458 345/55 |
| 2010/0017301 A1* | 1/2010 | Alva | G06Q 10/107 705/26.1 |
| 2010/0114891 A1* | 5/2010 | Oami | G06F 16/51 707/752 |
| 2010/0128987 A1* | 5/2010 | McAfee | G06F 16/51 382/190 |
| 2010/0168881 A1* | 7/2010 | Weber | G10L 25/48 700/94 |
| 2010/0174993 A1* | 7/2010 | Pennington | G06F 3/04817 715/738 |
| 2010/0194963 A1 | 8/2010 | Terashima | |
| 2010/0223824 A1* | 9/2010 | Mandelbaum | B42D 15/022 40/463 |
| 2011/0113379 A1* | 5/2011 | Doucet | G06F 3/04845 715/838 |
| 2011/0128242 A1* | 6/2011 | Carney | H04N 1/00442 345/173 |
| 2011/0206284 A1* | 8/2011 | Das | H04N 5/2251 382/224 |
| 2012/0102431 A1* | 4/2012 | Krolczyk | G11B 27/329 715/790 |
| 2013/0124951 A1* | 5/2013 | Shechtman et al. | 715/201 |

* cited by examiner

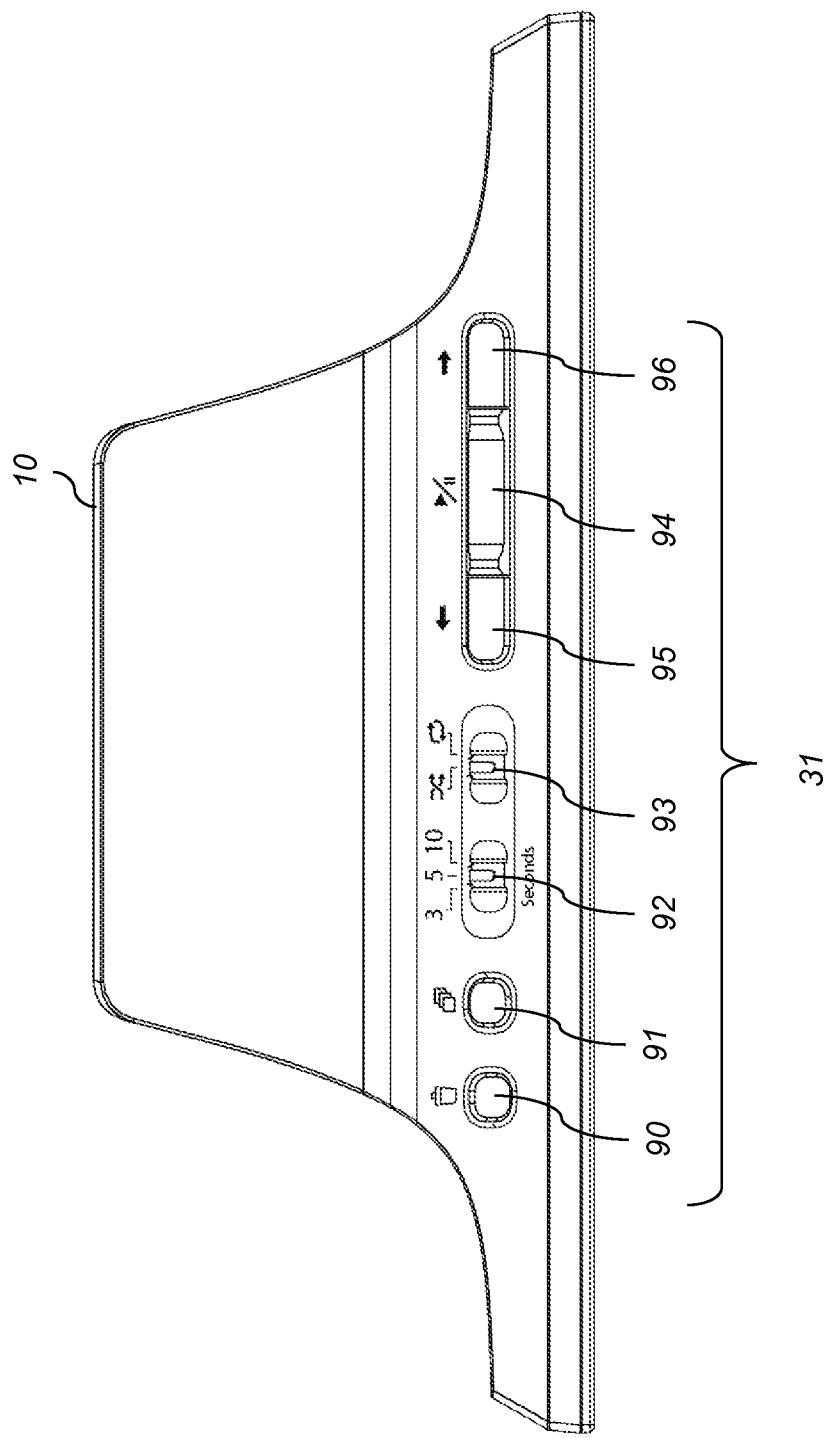

DISPLAY DEVICE FOR DISPLAYING RELATED DIGITAL IMAGES

CROSS-REFERENCE TO RELATED APPLICATIONS

Reference is made to commonly assigned, co-pending U.S. patent application Ser. No. 13/072,815, entitled: "Digital camera for reviewing related images", by Krolczyk et al., which is incorporated herein by reference in its entirety.

FIELD OF THE INVENTION

This invention pertains to the field of digital image display devices, and more particularly to a digital image display device for displaying a sequence of digital media assets, the digital media assets including both individual digital still images and groups of related digital still images.

BACKGROUND OF THE INVENTION

A digital media frame (also called a digital photo frame, a digital picture frame or a digital image display device) is a device that electronically stores and displays digital images. As used herein the term digital image (or digital media asset) includes both digital still images and digital video images. The digital images are typically captured using digital cameras (still or video), but may also be obtained using other types of digital image sources such as scanners. For example, U.S. Pat. No. 4,754,271 to Edwards, entitled "Liquid Crystal Photograph," describes a device resembling a pocket calculator which stores still pictures in a digital memory cartridge, and displays the pictures on a liquid crystal display (LCD) screen. The device includes an auto-sequencing mode which automatically changes the displayed image after a user-selectable time period, such as 5 seconds, or 5 minutes.

Digital media frames can include a modem to receive digital images over a communications network from computers or other devices, as described in commonly-assigned U.S. Pat. No. 7,155,679 to Bandaru, et al., entitled "Digital Media Frame," which is incorporated herein by reference. Such a digital media frame is commonly known as a "connected frame". This patent further teaches that the connected digital media frame can include an information mode which displays news headlines, stock trading news, weather reports, and advertising received over the communications network.

SUMMARY OF THE INVENTION

The present invention represents a digital image display device for displaying a sequence of digital media assets, the digital media assets including both individual digital still images and groups of related digital still images, comprising a display screen;
a processor;
an image memory for storing the digital media assets; and
a processor-accessible program memory storing executable instructions for causing the processor to execute the steps of:
designating a sequence of digital media assets for display in a sequential display mode;
specifying a display time duration; and
sequentially displaying each digital media asset in the sequence of digital media assets on the display screen, wherein if a displayed digital media asset is an individual digital still image it is displayed for the specified display time duration, and if a displayed digital media asset is a group of related digital still images the display time duration is subdivided into display time duration fractions and each of the digital still images in the group of related digital still images is displayed for a corresponding display time duration fraction.

This invention has the advantage that groups of related digital images are displayed in a fashion which gives them a similar level of emphasis to that given to an individual digital still image.

It has the additional advantage that groups of related digital images that originate from a burst capture mode are displayed in a way that highlights their relationship and provides a sense of motion.

BRIEF DESCRIPTION OF THE DRAWINGS

FIG. 5 represents a set of user interface controls for a digital image display device including a playback time interval selector;

Figure 1:
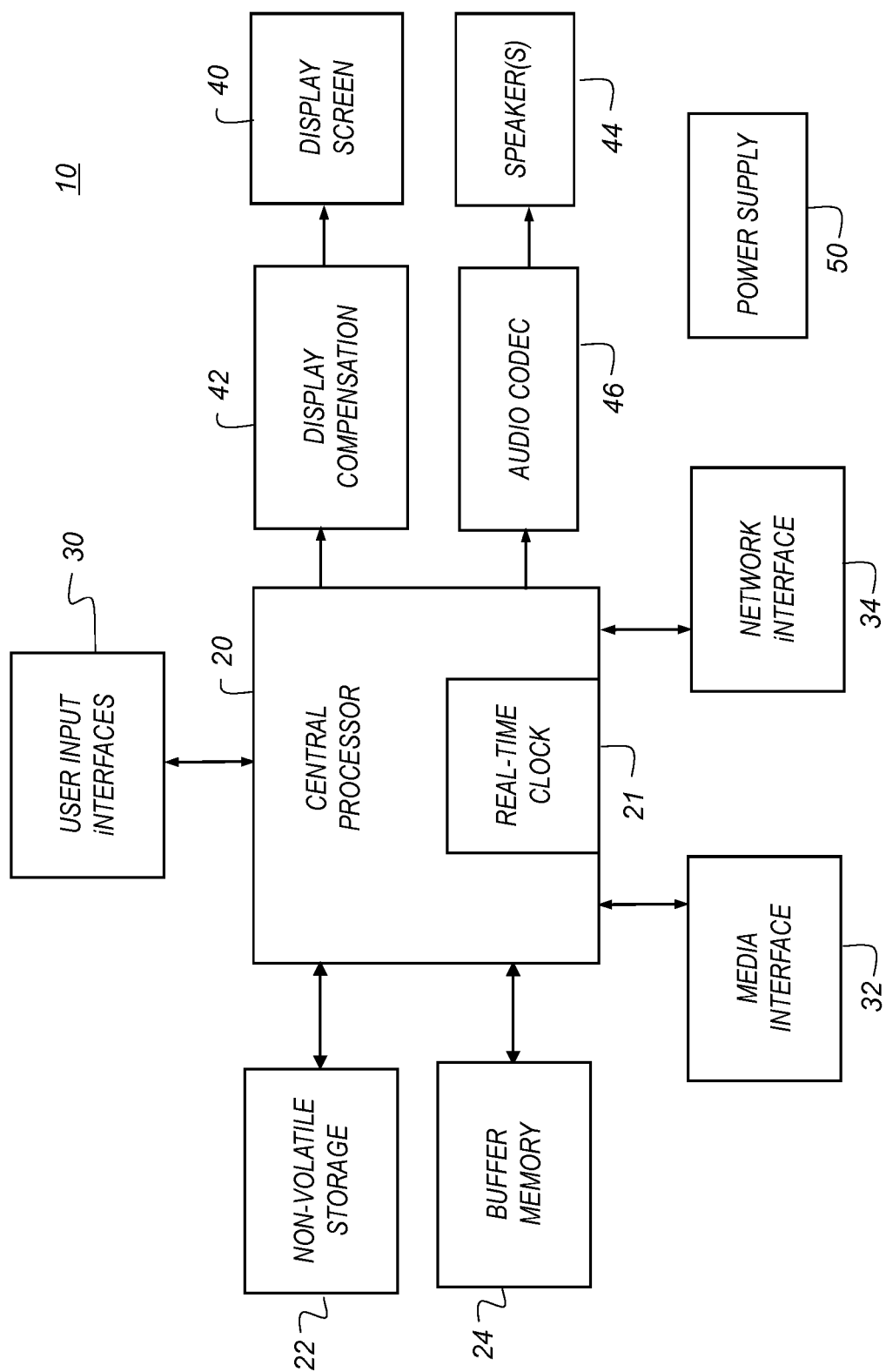
FIG. 1 is a high-level diagram depicting the components of a digital image display device.

It is to be understood that the attached drawings are for purposes of illustrating the concepts of the invention and may not be to scale.

DETAILED DESCRIPTION OF THE INVENTION

In the following description, some embodiments of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, a computer program for performing the method of the present invention can be stored in a non-transitory computer readable storage medium, which can include, for example; magnetic storage media such as a magnetic disk (e.g., a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program having instructions for controlling one or more computers to practice the method according to the present invention.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Because digital media frames and related circuitry for providing digital interfaces, digital image storage, digital image processing, and image display are well known, the present description will be directed in particular to elements forming part of, or cooperating more directly with, the method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

The following description of digital media frames will be familiar to one skilled in the art. It will be obvious that there are many variations of this embodiment that are possible and are selected to reduce the cost, add features or improve the performance of the digital media frame. The present invention is illustrated by way of example and not limitation in the accompanying figures.

Figure 2B:
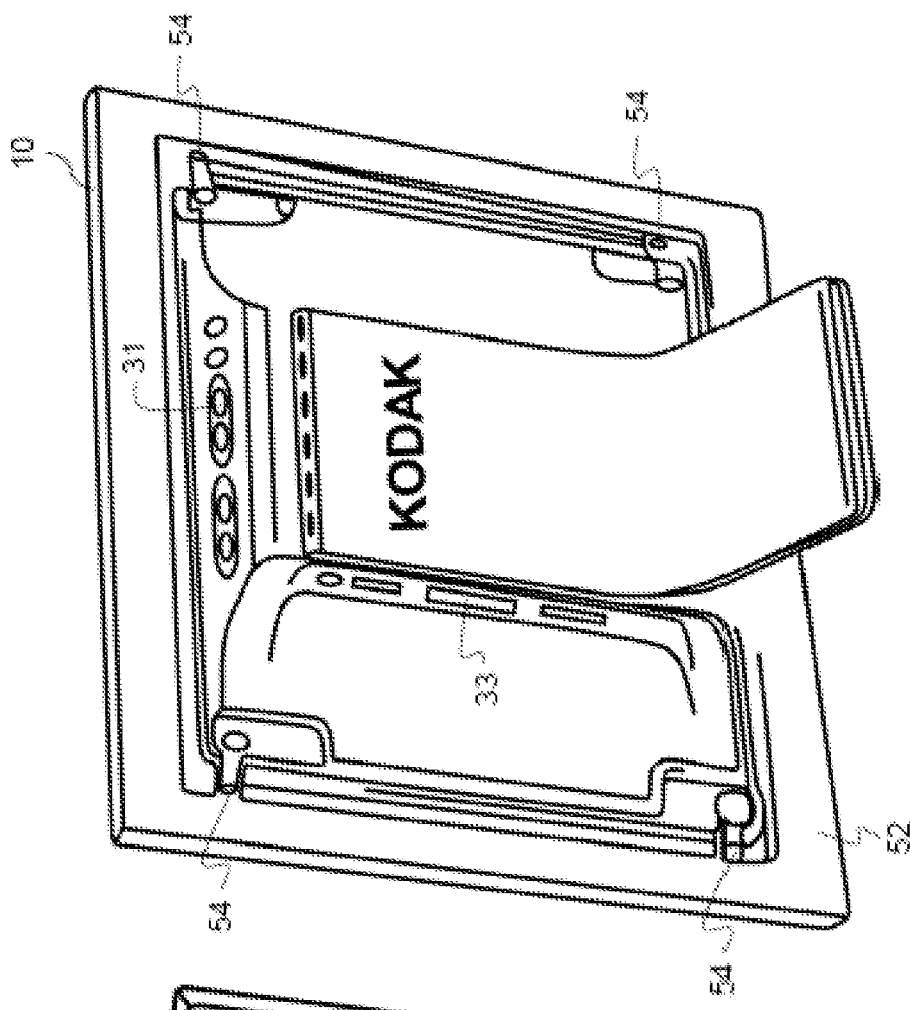
FIG. 2A and FIG. 2B depict the front and back of a digital image display device.
Figure 2A:
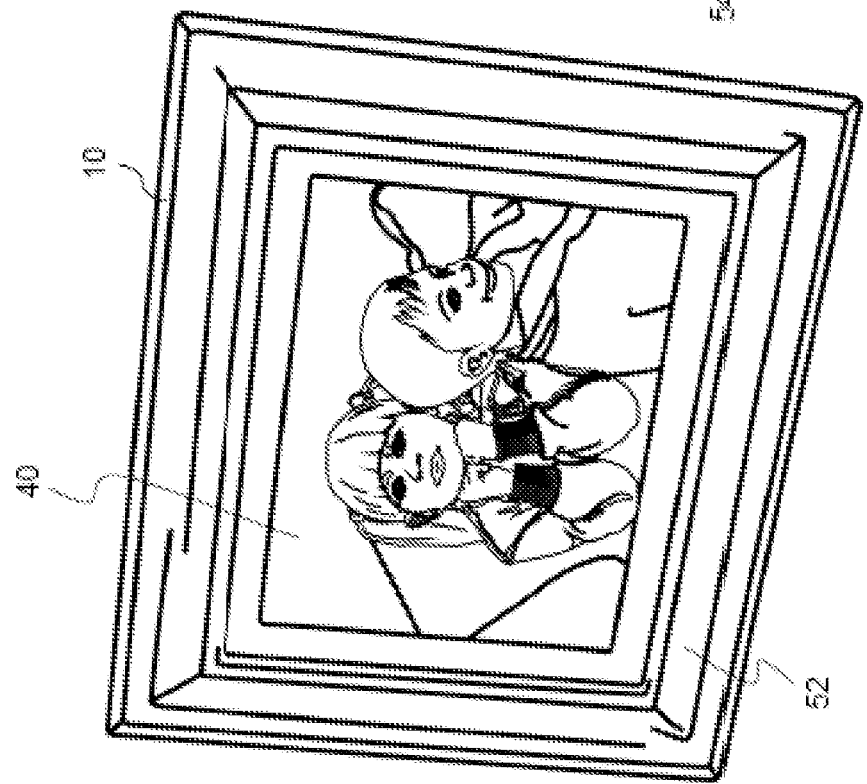

FIG. 1 is a high-level block diagram depicting an embodiment of a digital image display device 10. In a preferred embodiment, the digital image display device 10 is a digital media frame (i.e., a digital picture frame or a digital photo frame). However, in other embodiments, the digital image display device 10 can be any device having the ability to display digital media assets on a soft-copy display. Digital media assets would include both digital still images and digital video images. Examples of other types of digital image display devices 10 that can be used in accordance with the present invention would include tablet computers, personal computers, hand-held electronic devices (e.g., smart phones, PDAs or digital media players) and digital televisions. FIG. 2A depicts an embodiment of a front view of the digital image display device 10, and FIG. 2B depicts an embodiment of a rear view of the digital image display device 10. The digital image display device 10 includes a frame surround 52 which can be removed by moving the sliders 54 and replacing the frame surround 52 with a different frame surround, which may have a different color, finish, etc.

The digital image display device 10 allows a user to display digital media assets with minimal user intervention. The digital media assets to be displayed typically includes digital still images captured with a digital camera. The digital media assets to be displayed can also include video clips, graphic images, text, and animations. The digital media assets can also include audio information, such as music, speech, and sound effects.

Referring to FIG. 1, a central processor 20 in the digital image display device 10 provides the overall control of the digital image display device 10. The central processor 20 is coupled to a user input interfaces block 30, which enables a user of the digital image display device 10 to select operating modes and images to be displayed. The central processor 20 is also coupled to a media interface block 32, and a network interface block 34, which are used to provide digital media assets to the digital image display device 10. The central processor 20 is also coupled to a non-volatile storage block 22 via an interface, which provides a processor-accessible program memory that stores executable instructions that are used to control the operation of the central processor 20. Non-volatile storage block 22 can also serve as a processor-accessible image memory for storing a collection of digital media assets.

The central processor 20 is also coupled to a buffer memory block 24, which temporarily stores digital media assets for display on display screen 40. The central processor 20 is also coupled to a display compensation block 42, which processes the digital images and provides the compensated digital images to the display screen 40. The central processor 20 is also coupled to an audio codec block 46, which processes digital audio information and converts the digital audio information to one or more analog signals, which are provided to one or more speakers 44.

The user input interfaces block 30 can be provided using various conventional user input devices and circuits. For example, the user input interfaces block 30 can include a group of user buttons 31, such as those provided on the upper back of the digital image display device 10 in FIG. 2B. These user buttons 31 can include, for example, a forward function button, a reverse function button, and a pause function button. The forward function button allows the user to initiate the display of the next image in a playlist, the reverse function button allows the user to initiate the display of the previous image in a playlist, and the pause function button allows the user to initiate the continued display of the current image, until a different function button is pressed by the user. The user buttons 31 can also include a "menu" button, a "select" button" and a number of cursor movement buttons, such as "up," "down," "left" and "right," or some subset thereof. These can be used to select various operating modes.

In some embodiments, the user input interfaces block 30 includes a touch screen interface provided on the front surface of the display screen 40. In some embodiments, the touch screen interface can be implemented using IR emitters and detectors in front of, and parallel to, the display screen 40. A "touch" is detected by determining which IR beams have been blocked by the viewer's finger. In some embodiments, this can be implemented using a relatively small number of emitters and detectors. For example, using 5 emitters spaced vertically and 8 detectors spaced horizontally, enables the detection of 5×8 positions on the display screen. This is enough to allow touch buttons icons to be displayed on the display screen 40 and discern which button icon was touched by the viewer.

In some embodiments, the user input interfaces block 30 includes a touch sensitive input surface that can be positioned adjacent to the display screen 40. For example, the KODAK EASYSHARE P730 Digital Frame includes two "Quick Touch Border" capacitive touch strips, including a horizontally oriented touch strip adjacent the bottom of the display screen 40 and a vertically oriented touch strip adjacent the right side of the display screen 40. Menu items are displayed on the display screen 40 adjacent to these touch strips, and the viewer touches the strip at the appropriate location in order to select menu items. One advantage of the Quick Touch Border is that it keeps fingerprints off of the display screen 40.

In some embodiments, the user input interface can also include a pointing device such as a computer mouse, a joy stick, a track ball, or a track pad. In some embodiments, the user input interface can also include a remote control input device. The remote control can include user inputs which replicate some or all of the functions provided by the user buttons 31. In some embodiments, the user input interface can also include a voice recognition interface (including a microphone and speech recognition processor) or a gesture recognition interface that includes a sensing device (such as a camera) which recognizes user hand gestures or other user movements.

Non-volatile storage block 22 represents non-volatile storage memory, which may include, for example, flash EPROM memory. Non-volatile storage block 22 provides a processor-accessible program memory for storing executable instructions, such as firmware programs, for controlling the operation of the central processor 20.

In some embodiments, the firmware programs stored in non-volatile memory block 22 can be updated or replaced by new firmware provided using the media interface block 32 or the network interface block 34. In some embodiments, other types of non-volatile memory, such as Read Only Memory (ROM), magnetic disk storage or optical disc storage, can be used. In some embodiments, the central processor 20 includes an additional program memory (not shown), and the firmware programs stored in the non-volatile storage block 22 are copied into the program memory before being executed by the central processor 20.

The non-volatile storage block 22 can also be used to provide a processor-accessible image memory for storing a collection of digital media assets such as still images, video clips, sounds music, graphics, text, and other types of content which can be used to create the images displayed on the display screen 40 and the sounds output from speaker(s) 44. These sounds can include sounds captured by the digital still or video camera when the digital images were captured. These sounds can also include sounds (such as audio annotations) captured when the images were previously viewed, either by the user or another individual. These sounds can also include songs or music soundtracks that have been associated with the digital images. In some embodiments, at least some of the stored digital media assets are associated with particular events either automatically as a result of the image capture date, or as a result of manual selection by the user. The sounds can also include audio content associated with the particular events.

The non-volatile storage block 22 also stores auxiliary information (e.g. metadata) associated with the digital media assets. This metadata can include the date and time the image was captured by a digital capture device (e.g., a digital still camera or a digital video camera), or the date and time the image was received by the digital image display device 10. The metadata can also include data which identifies the individual or service that provided the digital media assets that was transferred to the digital image display device 10 using the system to be described later in reference to FIG. 3.

Buffer memory block 24 is a relatively small memory (compared to non-volatile storage block 22) which provides fast memory access for displaying images. The buffer memory block 24 can use, for example, one or more dynamic random access memory ("DRAM") or static random access memory ("SRAM") integrated circuits.

The media interface block 32 receives digital media files from various local external devices, such as removable media devices. For example, the media interface block 32 can include memory card and USB interface connectors 33 (FIG. 2B), to enable the digital image display device 10 to display media files stored on various removable Flash memory cards, such as a Secure Digital (SD) card, a micro SD card, a Compact Flash (CF) card, a MultiMedia Card (MMC), an xD card or a Memory Stick, as well as USB memory "sticks" or "jump drives". The digital media assets stored on these memory devices can be provided by digital computers, digital still cameras, digital video cameras, camera phones, PDAs, print and film scanners, and other types of digital imaging devices. The central processor 20 controls the media interface block 32 in order to transfer media files from the local external devices. The transferred files can be stored in the non-volatile storage block 22, or can be stored directly in the buffer memory block 24 for immediate display on the display screen 40. Thus, the media interface block 32, in combination with the removable memory card or memory "stick", provides a processor-accessible image memory for storing a collection of digital media assets, such as digital images.

The network interface block 34 can be used to enable other devices, such as computers or mobile imaging devices, to transfer digital media files to the digital image display device 10. The network interface block 34 can be provided using a wired interface, such as an Ethernet cable interface or a wired telephone modem. The network interface block 34 can also be provided using a wireless interface, such as a WiFi (e.g. IEEE 802.11 WiFi standard) modem, a cellular modem, or a Bluetooth modem.

In some embodiments, the network interface block 34 provides a direct connection to the Internet, and is configured to read HTML ("HyperText Markup Language") and to use TCP/IP ("Transmission Control Protocol/Internet Protocol"). In other embodiments, the network interface block 34 provides a connection to a local area network, which can then provide an Internet connection using a wired or wireless router or other type of network interface device, which either interfaces directly to the Internet, or to an Internet Service Provider (ISP). The display compensation block 42 is used to adjust the image data for the characteristics of the display screen 40. This can include tone scale adjustments, color adjustments, sharpness adjustments or any other type of appropriate adjustment. It should be noted that in some embodiments, the display compensation block 42 can be implemented by the central processor 20. In other embodiments, the display compensation block 42 and central processor 20 can be integrated into the same integrated circuit ("IC").

The display screen 40 displays images using a soft-copy display device, such as a color active matrix LCD ("Liquid Crystal Display"). Other types of soft-copy display devices may be used, such as an OLED ("Organic Light Emitting Diode") display, a CRT ("Cathode Ray Tube"), or various silicon-based displays.

A power supply 50 converts the AC power supplied via a wall plug to the proper DC voltages needed to provide power to all of the components of the digital image display device 10. In some embodiments, the power supply can include a re-chargeable battery, so that the digital image display device 10 can be portable, thus allowing it to be used for a period of time without a power cable, and outdoors. In some embodiments, the digital image display device 10 can include a solar panel which is used to charge the rechargeable battery.

In some embodiments, the digital image display device 10 includes a motion sensor (not shown). The motion sensor can provide a signal to the central processor 20, which controls the power supply 50 in order to supply power to the display screen 40 only when motion is detected. This reduces the power wasted when displaying images if there are no viewers in the vicinity of the digital image display device 10.

The central processor 20 runs two primary processes in order to display images and communicate with other system components, as will be described later in reference to FIG. 4A and FIG. 4B. A real-time clock 21 in the central processor 20 provides a date/time value. In some embodiments, the real-time clock 21 is manually configured by the user while in other embodiments, the real-time clock is configured using information accessed on an external device such as a Network Time Protocol (NTP) server using the network interface block 34.

It will be understood that the functions of the central processor 20 can be provided using a single programmable processor or by using multiple programmable processors, including one or more digital signal processor (DSP) devices. Alternatively, the central processor 20 can be provided by custom circuitry (e.g., by one or more custom integrated circuits (ICs) designed specifically for use in digital media frames), or by a combination of programmable processor(s) and custom circuits. It will be understood that connections between the central processor 20 and some of the blocks shown in FIG. 1 can be made using a common data bus. For example, in some embodiments the connection between the central processor 20, the non-volatile storage block 22, the buffer memory block 24, the media interface block 32, and the network interface block 34 can be made using a common data bus.

Figure 3:
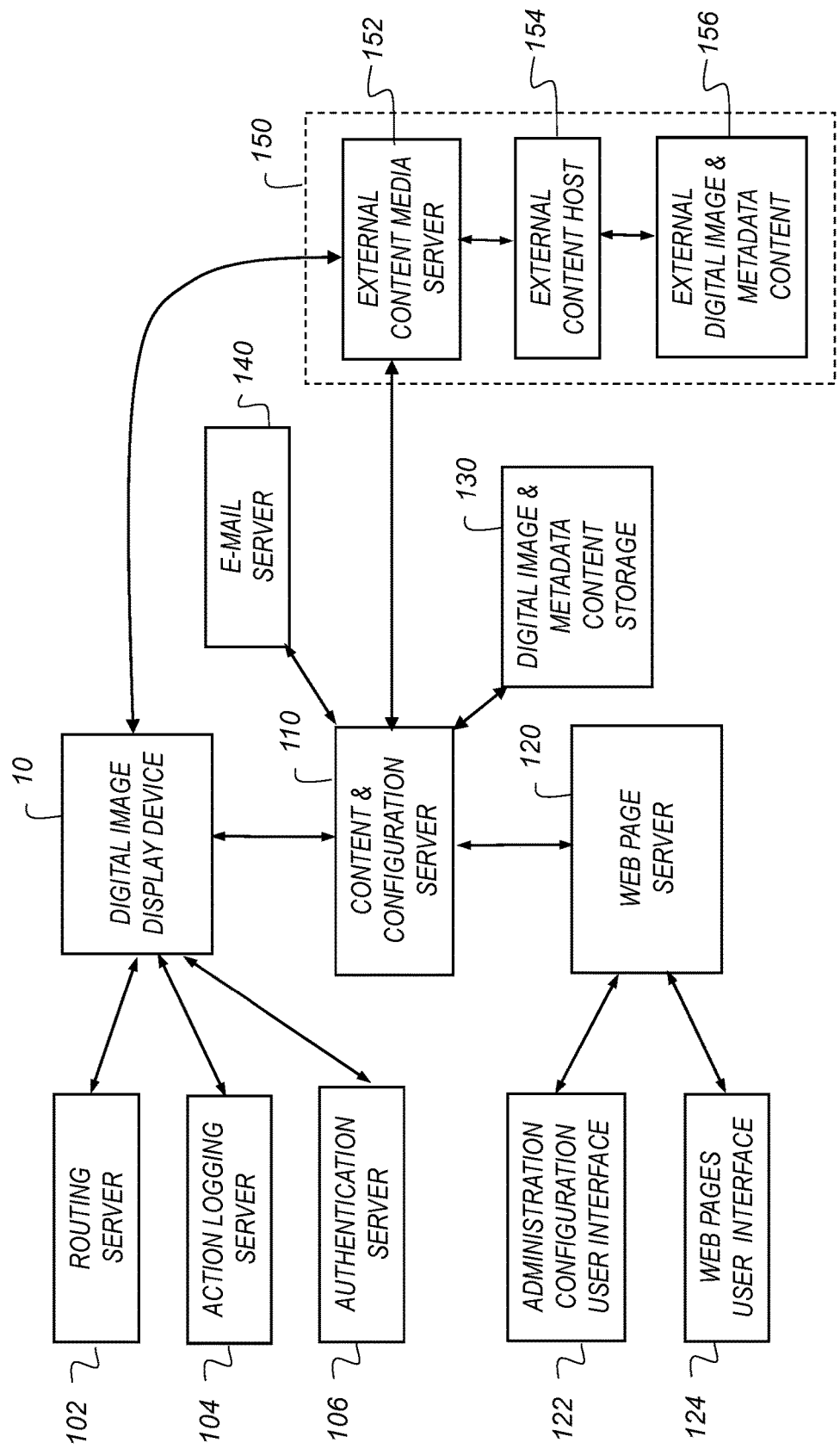
FIG. 3 is a high-level system diagram depicting how the digital image display device of FIG. 1 communicates with other devices to receive content and configuration information.

FIG. 3 is a high-level system diagram depicting an embodiment of how the digital image display device 10 can communicate over a network with other systems to receive content and configuration information. It will be understood that a large number of digital image display device 10 units, located at many different geographically dispersed locations, can be supported by the system depicted in FIG. 3. The digital image display device 10 communicates over a network (such as the Internet) with a routing server 102, an action logging server 104, and an authentication server 106. The digital image display device 10 also communicates over the network with content and configuration server 110. The content and configuration server 110 communicates with a web page server 120. The web page server 120 can be controlled by an administration configuration user interface 122 and a web pages user interface 124. The content and configuration server 110 can obtain digital image and metadata content and store it in digital image and metadata content storage 130. The digital image and metadata content can originate into this system from an E-mail server 140, from the web page server 120 or from one or more content providing systems 150. The content providing systems 150 can provide content from a variety of sources, such as Facebook, Flicker, the Kodak Gallery, and other on-line content storage systems and services.

Each content providing system 150 can include an external content media server 152 which communicates with an external content host 154 in order to supply external digital image and metadata content 156. The external digital image and metadata content 156 can be stored on hard drives or other digital storage devices or media that can be accessed by the external content host 154.

In some embodiments, the content and configuration server 110 only provides a list of digital media assets together with appropriate information about each digital media asset. The digital image display device 10 can subsequently access digital media files directly from the content providing systems 150.

It will be understood that the various blocks shown in FIG. 3 can be implemented using different hardware configurations. For example, the routing server 102, action logging server 104 and authentication server 106 can execute on the same physical hardware, or on different hardware. Furthermore, each server, such as routing server 102, may execute on multiple pieces of hardware in order to execute operations in parallel.

Figure 4A:
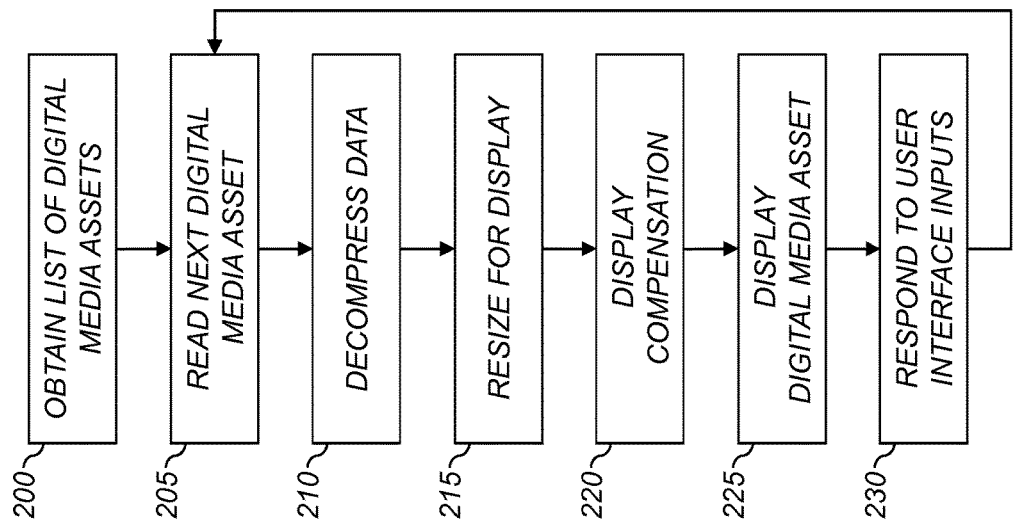
FIG. 4A is a high level flow diagram depicting a general image display process.

FIG. 4A is a high level flow diagram depicting a general image display process performed by the central processor 20 as a foreground process. In obtain list of digital media assets step 200, the central processor 20 gets a list of digital media assets to be displayed from the non-volatile storage block 22 or from some other digital media asset storage location (e.g., storage media connected via the media interface block 32, or a remote storage location accessible via the network interface block 34). A digital media asset is a discrete piece of digital media content such as a digital still image, a digital video clip, a digital audio clip or music file, as well as graphics, text, and other types of content that can be used to create the images displayed on the display screen 40 and the sounds output from speaker(s) 44 of the digital image display device 10. A collection of digital media assets is the set of all the digital media assets that are available for display or playback on the digital image display device 10. A list of digital media assets is a list of the individual digital media assets in the collection of digital media assets. This list can be stored as a formatted text file (e.g. an XML file), as a database or in some other custom storage format. The list can be provided in the display order in which content is to be displayed, or the display order can be specified as a separate field or as a subsequent list referring back to the assets in the list. In some operating modes of the digital image display device 10, the content is intentionally displayed in a randomized order.

In read next digital media asset step 205, the central processor 20 reads the list and determines the next digital media asset to display from the list. The central processor 20 then reads the digital media asset from the non-volatile storage block 22 or the storage media connected to media interface block 32. In some embodiments, the central processor 20 can read the digital media asset from a remote storage site via the network interface block 34.

In decompress data step 210, the central processor 20 decompresses the image data associated with the digital media asset and stores the decompressed image data in the buffer memory block 24. If the digital media asset is a video file, such as an MPEG 2 or MPEG 4 video file, the central processor 20 performs real-time decompression of the compressed video file.

In resize for display step 215, the central processor 20 scales the image data for display, by resizing the image data as necessary in order to match the image size (i.e., the display screen resolution) required by display screen 40. In some embodiments, the image size stored in buffer memory block 24 is slightly larger than the screen resolution, in order to allow for some panning/zooming effects as the image is displayed.

In display compensation step 220, the display compensation block 42 applies compensation to the image data before it is provided to the display screen 40. The compensation typically includes adjusting the image to account for the characteristics of the display screen 40 (e.g., an LCD panel). In some embodiments, the compensation may also adapt to the content of the specific image, for example, to provide image-specific enhancements.

In display digital media asset step 225, the central processor 20 displays the current digital media asset on the display screen 40. The central processor 20 can also display visual messages or user interface controls on the display screen 40, to indicate to the user of the digital image display device 10 various operating modes and options that can be selected by the user. In some embodiments, the central processor 20 provides these messages and controls using an on-screen graphics buffer, which can be stored in a portion of buffer memory block 24. The graphics information provided from this on-screen graphics buffer can be blended with the currently displayed image when the user activates one of the user interface elements of the user input interfaces block 30, such as a touch screen interface. In some embodiments, the text and icons are transparently overlaid on top of the currently displayed image. As will be described in more detail later, each digital media asset comprising digital still images is displayed for a specified time duration. The specified time duration can be a factory default time interval (e.g., 10 seconds per image) or can be a time interval selected by the user using appropriate user interface elements.

In respond to user interface inputs step 230, if the user makes a selection using one of the user input elements, the central processor 20 takes one or more actions in response to the user selection. This can include, for example, changing the display time for images, deleting an image from the collection of digital media assets, or selecting a subset of the collection of digital media assets to display.

Next execution returns to the read next digital media asset step 205 where the next digital media asset in the sequence of digital media assets is read. This process repeats until all of the digital media assets in the sequence of digital media assets has been displayed. In some embodiments, the digital image display device can be set to operate in a continuous loop so that the sequence of digital media assets is displayed repeatedly until the user terminates the display process.

The central processor 20 also controls the type of transition between images. The transition is a mechanism of "retiring" the current image while "phasing in" the next image. For example, one type of image transition moves the current and next images in one direction (e.g. left to right, or top to bottom) such that the current image moves out while the next image moves in. In another example, the image transition uses a cross-fade transition effect where the current image is faded out while the next image is faded in on top of the current image. Other types of fade transition can also be used. For example, the current image can be faded to black, and then the next image can be faded in. Those skilled in the art will recognize that many different types of transitions can also be used.

Figure 4B:
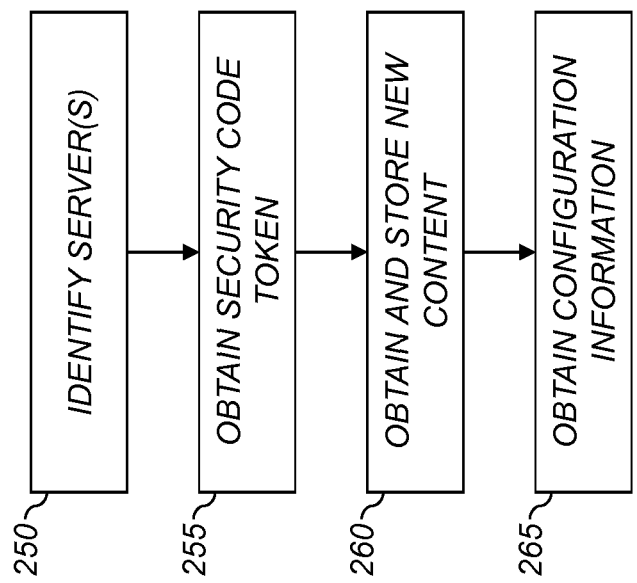
FIG. 4B is a high level flow diagram depicting a general system communications process.

FIG. 4B is a high level flow diagram depicting a general system communications process for secure information exchange over an insecure network, which is performed by the central processor 20 via the network interface block 34 as a background process. In some embodiments, the network interface block 34 is a WiFi wireless interface, which enables the digital image display device 10 to wirelessly communicate with various servers such as routing server 102, action logging server 104, authentication server 106 and content and configuration server 110 over a network, such as the Internet.

At startup, an identify server(s) step 250 is performed, during which the digital image display device 10 interfaces via network interface block 34 over the Internet to the routing server 102 at a known server location, in order to identify itself and determine how to proceed. The routing server 102 returns information to the digital image display device 10 that indicates which server(s) the digital image display device 10 should communicate with for all subsequent functions. The only address that is not allowed to change is the path to this routing server 102.

In obtain security code token step 255, the digital image display device 10 uses a secure communication method (e.g. https://) to query the authentication server 106 for a security code to communicate with the rest of the system. This query involves transmission of private information that is known by both the digital image display device 10 and the authentication server 106. The authentication server 106 generates a temporary security token and returns the token to the digital image display device 10. The token is made available to other parts of the server (and other servers) to allow authentication of the particular digital image display device 10 for future operations.

When the time window for the authentication token expires, any operations from the digital image display device 10 to one of the servers (other than the authentication server 106) will be rejected. In this situation, the digital image display device 10 then communicates with the authentication server 106 in order to acquire a new authentication token, before continuing with other operations. The use of a temporary token for most of the communications between the digital image display device 10 and each of the servers has the advantage of minimizing exposure to the private information shared between the digital image display device 10 and the authentication server 106 and the advantage of minimizing the computation required for subsequent communications by reducing the need for secure communications with a temporary token.

In obtain and store new content step 260, the digital image display device 10 communicates with the content and configuration server 110 in order to retrieve any new content that may be available. The digital image and metadata content provided by the content and configuration server 110 is organized into groups of pictures that are grouped by some combination of the source of the content (e.g., E-mail, Facebook or Kodak Gallery), a unique identifier of the sender of that content (e.g., the E-mail address of the sender who provided the content), and the date and time that the particular content was shared (or the instance of sharing). In some embodiments, a direct network upload sharing method can be used to provide content directly to the digital image display device 10. The direct upload sharing method can make use of various interfaces such as the well-known FTP or REST interfaces.

The digital image and metadata content provided by the content and configuration server 110 may also be organized by other information related to each particular content such as the location where the particular content was captured, keywords associated with the particular content, names or identity of people captured in the particular content, or things captured in the particular content.

The digital image and metadata content is obtained through a separate interface to content and configuration server 110, and is stored using an appropriate non-volatile storage (not shown) available to the content and configuration server 110. The content and configuration server 110 sends a description of the new content to be stored on the digital image display device 10. The central processor 20 in the digital image display device 10 then individually retrieves each of the digital media assets defined by the content and configuration server 110 and stores each digital media asset in the non-volatile storage block 22 in the digital image display device 10. The digital image display device 10 also transfers metadata related to each digital media asset, such as the sharing method (e.g., E-mail, Facebook or Kodak Gallery), an identifier for the individual providing the digital media asset, an identifier of the sharing instance, any descriptive text available related to the digital media asset. In some cases, a digital media asset can be a group of related digital still images. In this case, the metadata can include an indication the digital still images which belong to the group of related digital still images. For example, each digital still image in the group or related digital still images can be tagged with metadata indicating a unique group identifier.

In some embodiments, the digital media assets are only downloaded from the content and configuration server 110 at the time when they are to be displayed on the digital image display device 10, and are not stored locally in the non-volatile storage block 22 in the digital image display device 10. In some embodiments, the digital media assets are stored in non-volatile storage block 22 using a cache mechanism and the digital media assets are retrieved from the non-volatile storage block 22 if the digital media asset is stored in the non-volatile storage block 22 and has not been updated on the content and configuration server 110, and further, if the digital media asset is not stored in the non-volatile storage block 22 the central processor 20 retrieves the digital media asset from the content and configuration server 110 and stores the asset into the cache mechanism stored on the non-volatile storage block 22. The details of the data cache mechanism will be familiar to one knowledgeable in the arts.

The user can add content to the digital image display device 10 by using a web browser upload sharing method via the web pages user interface block 124 to upload digital images and other digital media assets to the web page server 120. The web page server 120 then stores these digital media assets and appropriate metadata.

In obtain configuration information step 265, the digital image display device 10 communicates with the content and configuration server 110 in order to retrieve configuration information. The configuration information includes settings such as the type of slideshow transition, the time interval for displaying each slideshow image, and the time of day to automatically turn the digital image display device 10 on and off.

In some embodiments, factory default configuration information is stored on the content and configuration server 110 automatically when a digital image display device 10 is registered. The user can utilize the web pages user interface block 124 to modify the configuration information. Additionally, configuration information can be modified by a system administrator using the administration configuration user interface 122, in order to address any service related issues or to provide updates.

The user can use the web pages user interface block 124 to permit E-mail transfer of digital media assets to their particular digital image display device 10. In this case, the user enters a specific E-mail address to enable content to be sent to their digital image display device 10. When E-mail is sent (typically by others) to that address on the E-mail server 140, the digital images and other relevant content is extracted from the E-mail and transferred to the digital image and metadata content storage 130. Metadata about the sender, sharing date, etc. is also stored in association with this content.

The user can also use the web pages user interface block 124 to configure their digital image display device 10 to receive digital media assets that are provided from one or more content providing systems 150 through various external services on the Internet. There are two primary mechanisms for how content is transferred from the external content providing systems 150, depending on how the external system operates.

In a first "pull" mechanism, the content and configuration server 110 periodically polls the external content media server 152 to determine whether new external digital image and metadata content 156 is available from external content host 154. If new content is available, the content and configuration server 110 retrieves the metadata for the new content and stores it in the digital image and metadata content storage 130. The original digital media asset data (e.g., still digital image or digital video file) is not transferred. When the digital image display device 10 later retrieves the list of digital media assets to retrieve, the URL for this new digital media asset will point back to the corresponding external content media server 152.

In a second "push" mechanism, the external content media server 152 provides a notification when new external digital image and metadata content 156 is available from external content host 154. In this case, the content and configuration server 110 configures the external content media server 152 to provide a notification whenever relevant additions or changes are made for the content requested. The external content media server 152 then notifies the content and configuration server 110 when content is added, modified or removed. The content and configuration server 110 then updates the digital image and metadata content stored on the digital image and metadata content storage 130 to reflect the new state of the external content providing systems 150. It will be understood that the content and configuration server 110 stores configuration information for a large number of digital image display device 10 units, and that each digital image display device 10 can be configured to permit content to be provided from a number of different external content providing systems 150 (such as Facebook, Flicker, Kodak Gallery, etc.) using "pull" or "push" mechanisms. The obtain and store new content step 260 and the obtain configuration information step 265 are repeated at regular intervals (e.g., every ten minutes) in order to obtain new content for digital image display device 10. In another embodiment, the obtain configuration information step 265 can be initiated by a message being "pushed" from the content and configuration server 110 to the digital image display device 10 that indicated new or updated content may be available on the content and configuration server 110.

In some embodiments, the digital image display device 10 has an "informational" mode as well as a "pictorial digital media asset" mode. The informational mode of digital image display device 10 displays various information, such as news headlines, financial data, advertising, and the like. The information can be displayed instead of, or along with, the pictorial digital media assets. In the latter case, the digital image display device 10 dedicates a portion of the display screen 40 to pictorial display while another portion of the screen is apportioned to informational display. The informational display can be located adjacent to the pictorial display, or can be overlaid on top of the pictorial display. The information to be displayed can be provided using the system depicted in FIG. 3. The types of information to be provided can be configured for a particular user of digital image display device 10 by using the web pages user interface block 124 to select the particular information of interest to the user. This can include information about particular stocks, sport teams, weather reports, news categories, shopping, gambling, etc., which are of interest to the user. In some embodiments, the information can be provided by various information content web servers (not shown) which provide content to the content and configuration server 110. In other embodiments, the digital image display device 10 can communicate directly with the external web sites (not shown) that provide the information, in order to receive and display web pages, using a web browser implemented in the digital image display device 10.

FIG. 5 shows a view of the user buttons 31 associated with the user interface controls for the example digital image display device 10 shown in FIGS. 2A and 2B. The user buttons 31 include a delete button 90, which can be used to delete the currently displayed digital media asset from the image memory (e.g., non-volatile storage block 22 (FIG. 1)) in the digital image display device 10.

The user buttons 31 also include a copy button 91, which can be used to initiate a process to copy digital media assets from a removable memory card inserted in the interface connector 33 (FIG. 2B) to the non-volatile storage block 22 (FIG. 1).

Figure 6:
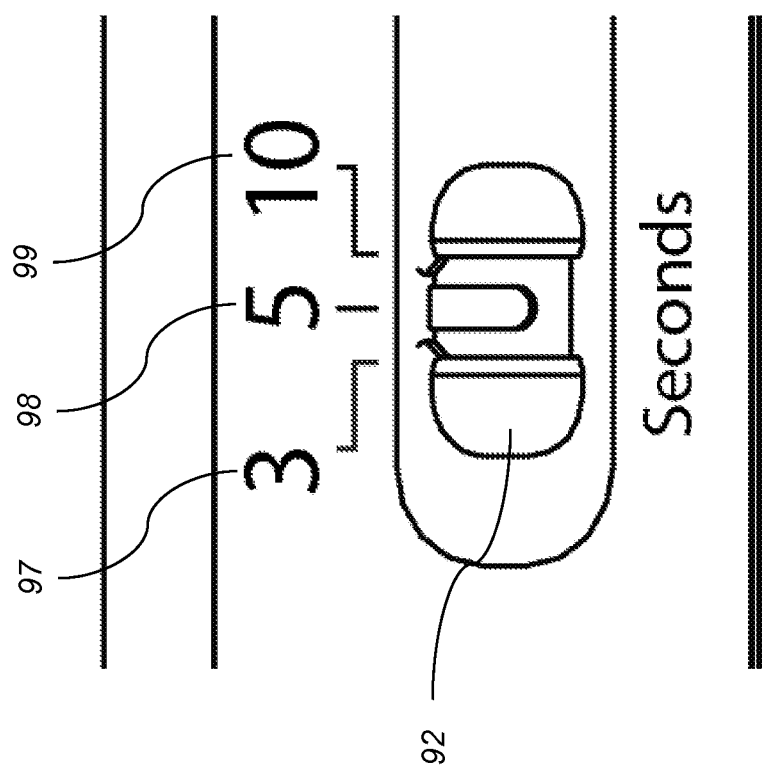
FIG. 6 represents a close-up of the playback time interval selector of FIG. 5.
Figure 7:
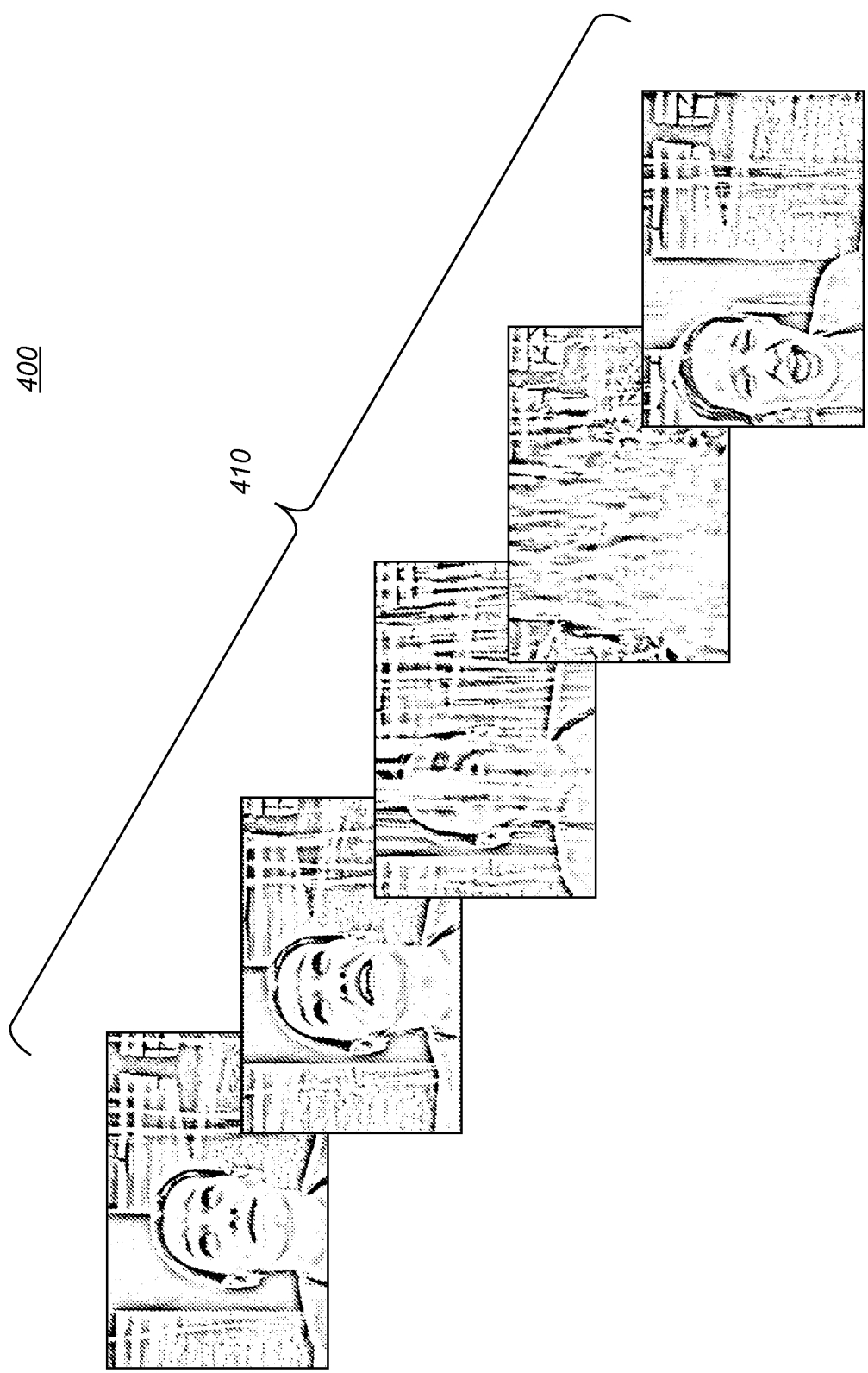
FIG. 7 illustrates a digital media asset including of a group of five related digital still images.

The user buttons 31 also include a playback time interval selector 92, which enables the user to specify a time interval to be used for displaying the digital media assets. FIG. 6 shows a close-up view of the playback time interval selector 92. The available settings include a three-second time interval 97, a five-second time interval 98 and a ten-second time interval 99.

The user buttons 31 of FIG. 5 also include a playback order selector 93. The playback order selector 93 can be used to select between a random shuffle mode where the digital media assets are displayed in a random order, and a time sequential mode where the digital media assets are displayed in an order according to their associated capture times.

A play/pause button 94 can be used to toggle between a pause mode where the asset display process is paused at the currently displayed digital media asset, and a play mode where the digital media assets are displayed according to specified playback order. A display previous button 95 can be used to manually return to the previously displayed digital media asset, and a display next button 96 can be used to manually advance to the next digital media asset in the specified playback order.

The digital media assets that are displayed on the digital image display device 10 are typically captured using digital still cameras or digital video cameras. They can also come from other sources such as digital scanners and computer generated graphics. The digital media assets can include digital still images and digital video images. Digital still images are single digital images stored in a digital file such as a ".jpeg" or a ".tiff" file. Digital video images include a time sequence of digital image frames, and are typically stored as a single digital file such as a ".mov" or a ".avi" file. Digital video images are viewed using software that presents the individual digital image frames at a specified frame rate to create the appearance of motion.

Figure 8:
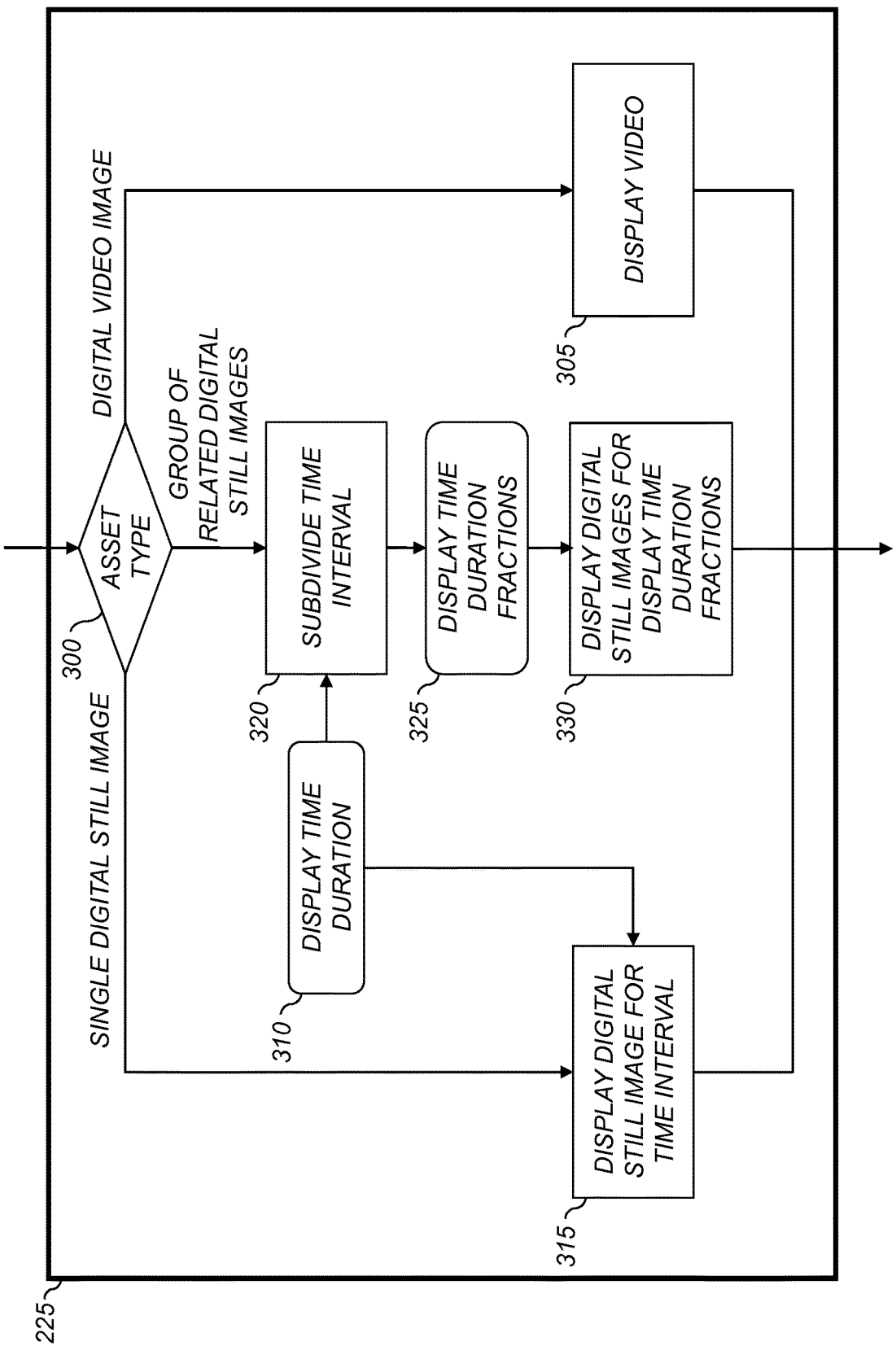
FIG. 8 is a flow diagram depicting additional details for the display digital media asset step of FIG. 4A according to a preferred embodiment.

Some digital still cameras include a burst image capture mode, where a sequence of digital still images are captured in a short time interval. For example, U.S. Pat. No. 7,787,026 to Flory et al., entitled "Continuous burst mode digital camera," teaches a digital still camera adapted to operate in a burst capture mode. Burst capture modes are often used to capture a sequence of digital images representing motion in the scene. For example, a burst of digital images can be captured for a baseball player swinging a bat, or a person blowing out the candles on a birthday cake. Such a burst of digital images represents an example of a group of related digital still images. An example of a digital media asset 400 including a group of related digital still images 410 is illustrated in FIG. 8. The group of related digital still images 410 is a burst of digital still images corresponding to a bucket of water being dumped over the head of an individual. A digital camera for capturing and reviewing groups of related digital still images is described in commonly assigned, co-pending U.S. patent application Ser. No. 13/072,815, entitled "Digital camera for reviewing related images," which is incorporated herein by reference.

In some applications, a group of related digital still images can be formed using a software tool to collect and associate a set of related digital still images. The group of related digital still images can be related in a variety of ways. For example, they can be digital still images of a particular object or person or scene captured at a series of different times. For example, a particular set of related digital still images can be a time lapse photography series of digital still images captured at regular intervals showing the blossoming of a flower. Similarly, sets of related digital still images can also include other types of time series, which may be captured at regular or irregular time intervals over a longer period of time. For example, the set of related digital still images can be a set of digital still images captured on a child's first day of school for a series of years, or a series of digital still images showing various stages in the construction of a house.

A group of related digital still images can be treated as a single digital media asset. In some embodiments, a group of related digital still images can be stored as a set of independent digital image files. Preferably, the group of related digital still images are stored together with metadata indicating a linkage between the individual digital still images in a particular group of related digital still images. In some embodiments, the metadata can be stored in the header of each digital image file associating the digital still image with one or more groups of related digital still images. For example, a unique group identifier can be defined for each group of related digital still images, and the group identifier can be stored as metadata in each digital still image in the group of related digital still images (e.g., using the metadata format associated with the well-known EXIF digital image file format). In some embodiments, a group sequence value is also stored as metadata indicating an order of the digital still images in the group.

Alternately, the groups of related digital still images can be defined in different ways. For example, metadata can be stored in a different data file providing a list of groups of related digital still images, together with a list of digital still images to be included in each of the groups. Alternately, the related digital images can be grouped by putting them into a "folder" within the file structure of the image memory. All of the digital still images within a folder can be assumed to be members of a group of related digital still images. Generally, groups of related digital still images will include a relatively small number of digital still images. In some embodiments, if the number of digital still images in a particular folder exceeds a predefined threshold (e.g., 20), it can be assumed that the digital still images are all individual digital still images rather than belonging to a group or related digital still images.

In other embodiments, a collection of digital still images can be automatically analyzed to identify groups of related digital still images. For example, a set of digital still images having associated capture times that fall within a predefined time interval of each other (e.g., 5 seconds) can be automatically designated to be a group of related digital still images under the assumption that they were captured in a burst mode. In some embodiments, an image similarity metric can be calculated for any groups of related digital still images identified in this way to confirm that they appear to be images of the same scene. Only digital still images having a high degree of image similarity will be included in the group of related digital images.

In other embodiments, the group of related digital images can be stored within a single digital file. For example, the individual digital still images can be stored within a single ".pdf" file. In alternate embodiments a proprietary file format can be used to store the group of related digital still images. For example, the first digital still image in a group of related digital images can be stored in a conventional digital still image file, and the remaining digital still images in the group of related digital images can be stored as proprietary metadata within the digital still image file. (For example, the remaining digital still images can be stored in APP4 segments in digital image files encoded using the well-known EXIF file format specification.) In some embodiments, the remaining digital still images can be stored at a lower resolution, or using a lower image compression quality setting relative to the first digital still image.

According to the method of the present invention, the digital image display device 10 adjusts the display time duration used to groups of related digital still images relative to the display time duration used to display individual still images. In a preferred embodiment, a display time duration is specified to be used to display digital media assets on the digital image display device 10. (For example, the display time duration can be specified using the playback time interval selector 92 shown in FIG. 5.) When the digital media asset is a single digital still image, it is displayed for the specified display time duration. However, when the digital media asset is a group of related digital still images the specified display time duration is subdivided such that each of the digital still images in the group of related digital still images is displayed for a fraction of the specified display time duration.

FIG. 8 is a flow diagram depicting additional details for the display digital media asset step 225 of FIG. 4A according to a preferred embodiment. When the display digital media asset step 225 receives a digital media asset, an asset type test 300 is used to determine a type for the digital media asset. If the digital media asset is a digital video image, then a display video step 305 is used to display the digital video image on the display screen 40 (FIG. 2) of the digital image display device 10.

If the asset type test 300 determines that the digital media asset is a single digital still image, then a display digital still image for time interval step 315 is used to display the single digital still image on the display screen 40 (FIG. 2) of the digital image display device 10 for a specified display time duration 310. The display time duration 310 can be predefined, or can be specified using a user interface control such as the playback time interval selector 92 shown in FIG. 5.

If the asset type test 300 determines that the digital media asset is a group of related digital still images, then a subdivide time interval step 320 is used to subdivide the display time duration 310 into display time duration fractions 325. In a preferred embodiment, the display time duration fractions 325 are set to be equal to the display time duration 310 divided by the number of digital images in the group of related digital still images. For example, if the display time duration 310 is five seconds, and the group of related digital still images has five images, then the display time duration fractions 325 would each be set to a value of one second.

In this example, each digital image in the set of related digital images will be displayed for an equal display time duration fraction 325. In alternate embodiments, different display time duration fractions 325 can be determined for each of the digital still images according to some appropriate strategy. For example, the first image in the group of related digital still images can be allotted a longer time interval fraction than the rest of the digital still images. In a preferred embodiment, the display time duration fractions 325 are defined so that the sum of the display time duration fractions 325 will be equal to the display time duration 310. In this way, a group of related digital still images is given a similar emphasis to an individual digital still image.

In other embodiments, the sum of the display time duration fractions 325 may be different than the display time duration 310. For example, a minimum display time duration fraction (e.g., 0.5 seconds) can be defined such that if the display time duration fraction 325 is calculated to be less than the minimum display time duration fraction, it is reset to be equal to the minimum display time duration fraction. In this case, if a digital media asset has a large group of related digital still images, it may be displayed for a total display time duration longer than the specified display time duration 310. In this way the sum of the display time duration fractions 325 may be extended to be greater than the display time duration 310.

Once the display time duration fractions 325 have been determined, a display digital still images for display time duration fractions step 330 is used to display each of the digital still images in the group of related digital still images on the display screen 40 (FIG. 2) of the digital image display device 10 according to the determined display time duration fractions 325. As noted earlier, in some embodiments, a different display time duration fraction 325 can be used for some or all of the digital still images in the group of related digital still images.

The order that the digital still images in the group of related digital still images are displayed can be determined in various ways. In some embodiments, the digital still images are stored in digital image files that are named using to a sequential file naming convention that includes an image sequence number (e.g., IMG0105.JPG). In this case, the order can be determined by sorting the image sequence numbers. For cases where the digital image files are not named according to a sequential file naming convention, the order can be determined by sorting the digital still images according to associated image capture times. In other embodiments, the order that the digital still images should be displayed can be specified by storing a group sequence value indicating a desired display order as metadata. The group sequence values can be specified in a variety of different ways. For example, they can be user specified, or they can be specified by a digital camera that captured the group of related digital still images using a burst capture mode.

As discussed earlier, various transition effects can be used to transition between the display of the digital media assets. For example, a cross-fade transition can be used between the individual digital still images in a group of related digital still images. In this way, a particular group of related digital still images corresponding to a time sequence will be displayed with the appearance of a pseudo video sequence in order to provide a sense of motion.

In some embodiments, a different transition effect can be specified to transition between the individual digital still images in a group of related digital still images than is used between each digital media asset. For example, a cross-fade transition can be used between the individual digital still images in a group of related digital still images, whereas a push transition can be used to transition between digital media assets.

Figure 9:
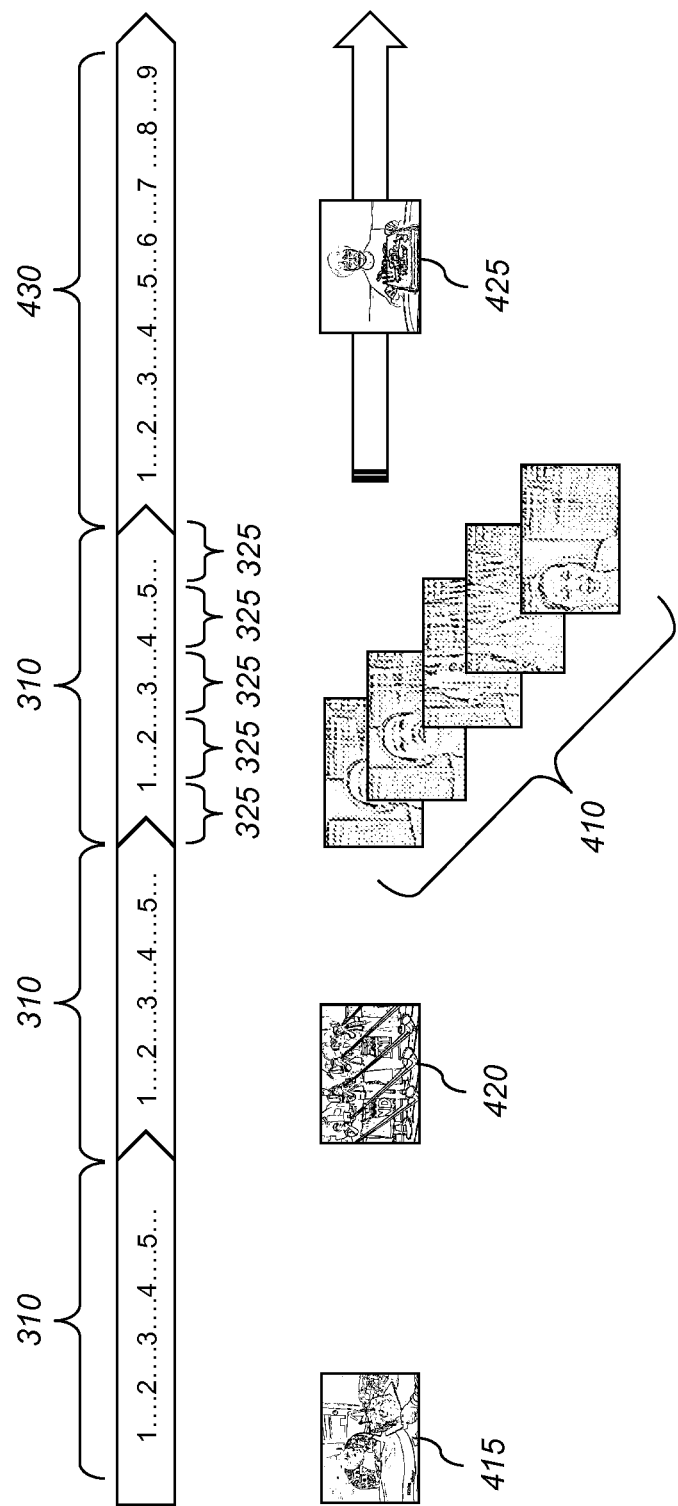
FIG. 9 represents an example of a playback sequence for a sequence of digital media assets.

FIG. 9 shows a time line associated with displaying an example sequence of digital media assets according to the method described with reference to FIG. 8. The sequence of digital media assets includes a first single digital still images 415, a second single digital still image 420, a group of related digital still images 410 and a digital video image 425. For this example, the group of related digital still images 410 includes five individual digital still images, the display time duration 310 is set to be five seconds, and the digital video image 425 has a nine-second digital video time duration 430. The first single digital still image 415 is displayed for the five second display time duration 310. Similarly, the second single digital still image 420 is displayed for the five second display time duration 310. Next, the group of related digital still images 410 is displayed. The display time duration 310 is subdivided into five equal one second display time duration fractions 325. Each of the individual digital still images in the group of related digital still images 410 is displayed for the one second display time duration fractions 325. Finally, the digital video image 425 is played for its nine second digital video time duration 430.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

PARTS LIST 10 digital image display device
20 central processor
21 real-time clock
22 non-volatile storage block
24 buffer memory block
30 user input interfaces block
31 user buttons
32 media interface block
33 interface connector
34 network interface block
40 display screen
42 display compensation block
44 speaker(s)
46 audio codec block
50 power supply
52 frame surround
54 sliders
80 graphical user interface
82 play all icon
84 play recent icon
86 recently received assets box
90 delete button
91 copy button
92 playback time interval selector
93 playback order selector
94 play/pause button
95 display previous button
96 display next button
97 3 second time interval
98 5 second time interval
99 10 second time interval
102 routing server
104 action logging server
106 authentication server
110 content and configuration server
120 web page server
122 administration configuration interface
124 web pages user interface
130 digital image and metadata content storage
140 E-mail server
150 content providing system
152 external content media server
154 external content host
156 external digital image and metadata content
200 obtain list of digital media assets step
205 read next digital media asset step
210 decompress data step
215 resize for display step
220 display compensation step
225 display digital media asset step
230 respond to user interface inputs step
250 identify server(s) step
255 obtain security code token step
260 obtain and store new content step
265 obtain configuration information step
300 asset type test
305 display video step
310 display time duration
315 display digital still image for time interval step
320 subdivide time interval step
325 display time duration fractions
330 display digital still images for display time duration fractions step
400 digital media asset
410 group of related digital still images
415 single digital still image
420 single digital still image
425 digital video image
430 digital video time duration

The invention claimed is:

1. A digital image display device for displaying a sequence of digital media assets, comprising:
   a display screen;
   a processor;
   an image memory configured to store digital media assets, wherein each digital media asset consists of either an individual digital still image or a group of related digital still images; and
   a processor-accessible program memory storing executable instructions, wherein the processor is configured to execute the executable instructions to:
      determine whether new digital media assets are available from a plurality of external content providing systems by periodically polling the external content providing systems;
      retrieve and store metadata for the new digital media assets in response to the determination of the periodic poll that new digital media assets are available, wherein the metadata for each of the new digital media assets comprises an indication of the corresponding external content providing system;
      automatically analyze the metadata for the new digital media assets and associate any new digital media assets together as a group of related digital still images based on having a metadata similarity, including a group sequence value indicating a display order specific to the new digital media assets associated together as a group;
      create a display list and a display order, wherein the display list identifies digital media assets to be displayed on the display screen and includes at least one of the new digital media assets, wherein the display order arranges the digital media assets on the display list into a display sequence based on the metadata indicating their corresponding external content providing system, wherein the display order is determined by image sequence numbers, image capture times, or group sequence values;
      specify a uniform display time duration for the stored digital media assets;
      determine which of the digital media assets consist of an individual digital still image;
      determine which of the digital media assets consist of a group of related digital still images;
      for each digital media asset consisting of a group of related digital still images, calculate fractional display time durations by subdividing the uniform display time duration into equal fractional display time durations wherein an amount of the fractional display time durations equals an amount of digital still images in the respective group of related digital still images;
      access, via the image memory, the stored digital media assets identified on the display list and arrange the digital media assets according to the display order;
      scale image data for each of the digital media assets to appropriately size each of the digital media assets for display on the display screen; and
      display the stored digital media assets one-by-one in full screen on the display screen according to the display order on a continuous loop, wherein each digital media asset is displayed for a duration equal to the uniform display time duration, and wherein the digital media assets consisting of a group of related digital images are displayed so that the digital still images in the group of related digital still images are each displayed for durations equal to the fractional display time durations calculated for that respective group of related digital still images.

2. The digital image display device of claim 1 wherein the uniform display time duration is user selectable using user controls.

3. The digital image display device of claim 1 wherein a transition effect is applied to transition between the display of digital still images in each of the groups of related digital still images.

4. The digital image display device of claim 3 wherein the transition effect is a cross-fade transition effect.

5. The digital image display device of claim 3 wherein a different transition effect is used to transition between each digital media asset while being consecutively displayed than is used to transition between the display of digital still images in each of the groups of related digital still images.

6. The digital image display device of claim 1 wherein the digital media assets further comprise one or more digital video images.

7. The digital image display device of claim 6 wherein each digital video image has an associated digital video time duration, and wherein each digital video image is displayed according to its associated digital video time duration.

8. The digital image display device of claim 7 wherein a first digital still image in a particular group of related digital still images is stored in an associated digital file, and wherein the remaining digital still images in the particular group of related digital still images are stored as metadata within the associated digital file.

9. The digital image display device of claim 1 wherein the digital still images in a particular group of related digital still images are each stored in individual digital files, together with metadata indicating a linkage between the individual digital files.

10. The digital image display device of claim 1 wherein a set of digital still images having associated capture times that fall within a predefined time interval of each other are automatically designated to be a group of related digital still images.

11. The digital image display device of claim 1 wherein a particular group of related digital still images corresponds to a set of digital still images captured by a digital camera using a burst capture mode.

12. The digital image display device of claim 1 wherein a particular group of related digital still images includes digital still images of a particular object or person or scene captured at a series of different times.

13. The digital image display device of claim 12 wherein the particular group of related digital still images represents a time lapse photography series.

14. The digital image display device of claim 1 wherein the digital still images within a particular group of related digital still images are displayed in an order according to associated image capture times.

15. The digital image display device of claim 1 wherein the digital still images within a particular group of related digital still images are stored in digital image files named using a sequential file naming convention including an image sequence number, and wherein the digital still images within the particular group of related digital still images are displayed in an order according to the image sequence number.

16. The digital image display device of claim 1 wherein the digital still images within a particular group of related digital still images are displayed in an order according to metadata associated with the digital still images indicating a desired display order.

17. A method for displaying a sequence of digital media assets on a display screen comprising:

determining whether new digital media assets are available from a plurality of external content providing systems by periodically polling the external content providing systems;

retrieving and storing metadata for the new digital media assets in response to the determination of the periodic poll that new digital media assets are available, wherein the metadata for each of the new digital media assets comprises an indication of the corresponding external content providing system;

automatically analyzing the metadata for the new digital media assets and associate any new digital media assets together as a group of related digital still images based on having a metadata similarity, including a group sequence value indicating a display order specific to the new digital media assets associated together as a group;

creating a display list and a display order, wherein the display list identifies particular digital media assets to be displayed on the display screen and includes at least one of the new digital media assets, wherein the display order arranges the digital media assets on the display list into a display sequence based on the metadata indicating their corresponding external content providing system, wherein the display order is determined by image sequence numbers, image capture times, or group sequence values, wherein each digital media asset on the display list consists of either an individual digital still image or a group of related digital still images, wherein all digital still images are stored as individual digital files containing metadata, and wherein the groups of related digital still images include digital still images having at least one common metadata;

specifying a uniform display time duration for the digital media assets;

determining which of the digital media assets consist of an individual digital still image;

determining which of the digital media assets consist of a group of related still images;

for each digital media asset consisting of a group of related digital still images, calculating fractional display time durations by subdividing the uniform display time duration into equal fractional display time durations, wherein an amount of the fractional display time durations equals an amount of digital still images in the respective group of related digital still images;

accessing, via the remote storage location, the digital media assets identified on the display list and arranging the digital media assets according to the display order;

scaling image data for each of the digital media assets accessed via the remote storage location to appropriately size the digital media assets for display on the display screen; and displaying the accessed digital media assets one-by-one in full screen on the display screen according to the display order on a continuous loop, wherein each digital media asset is displayed for a duration equal to the uniform display time duration, and wherein the digital media assets consisting of a group of related digital images are displayed so that the digital still images in the group of related digital still images are each displayed for durations equal to the fractional display time durations calculated for that respective group of related digital still images.

* * * * *